(12) United States Patent
Bailey

(10) Patent No.: US 11,470,278 B2
(45) Date of Patent: Oct. 11, 2022

(54) REFLECTION-LESS IN-HOME NETWORK ADAPTER

(71) Applicant: PPC BROADBAND, INC., East Syracuse, NY (US)

(72) Inventor: Paul Bailey, Camillus, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 17/179,865

(22) Filed: Feb. 19, 2021

(65) Prior Publication Data

US 2021/0176424 A1    Jun. 10, 2021

Related U.S. Application Data

(63) Continuation of application No. 16/248,241, filed on Jan. 15, 2019, now Pat. No. 11,019,304.

(Continued)

(51) Int. Cl.
*H04N 7/10* (2006.01)
*H04L 12/28* (2006.01)
(Continued)

(52) U.S. Cl.
CPC ............ *H04N 7/104* (2013.01); *H04H 20/63* (2013.01); *H04H 20/78* (2013.01);
(Continued)

(58) Field of Classification Search
CPC .... H04N 7/104; H04N 7/106; H04N 21/6118; H04N 21/6168; H04H 20/63;
(Continued)

(56) References Cited

U.S. PATENT DOCUMENTS 6,545,564 B1    4/2003  Coppola
8,752,114 B1    6/2014  Shapson
(Continued)

OTHER PUBLICATIONS

Gallo, A., "Basics of RF Electronics", CERN Yellow Report CERN-2011-007, pp. 223-275, Dec. 14, 2011, https://arxiv.org/abs/1112.3226, retrieved Mar. 11, 2019, figures 7-10, section 5, pp. 6-7.

(Continued)

*Primary Examiner* — Nasser M Goodarzi
*Assistant Examiner* — Adil Ocak
(74) *Attorney, Agent, or Firm* — MH2 Technology Law Group LLP

(57) ABSTRACT

A system includes an input and a plurality of outputs. The system also includes an in-home network adapter configured to connect to and be positioned between the input and the plurality of outputs. The system also includes a splitter configured to connect to and be positioned between the in-home network adapter and the plurality of outputs. The input is configured to receive signals in a cable television (CATV) bandwidth and signals in a multimedia over coax alliance (MoCA) bandwidth. The in-home network adapter is configured to allow the signals in the MoCA bandwidth to pass from the input to the plurality of outputs and from the plurality of outputs to the input. The in-home network adapter is configured to attenuate or prevent the signals in the CATV bandwidth from passing from the input to the plurality of outputs, from the plurality of outputs to the input, or both.

67 Claims, 9 Drawing Sheets

Related U.S. Application Data

(60) Provisional application No. 62/684,579, filed on Jun. 13, 2018, provisional application No. 62/618,224, filed on Jan. 17, 2018.

(51) Int. Cl.
  *H04H 20/78* (2008.01)
  *H04H 20/63* (2008.01)
  *H04N 21/61* (2011.01)

(52) U.S. Cl.
  CPC ...... *H04L 12/2801* (2013.01); *H04L 12/2838* (2013.01); *H04L 12/2898* (2013.01); *H04N 7/106* (2013.01); *H04N 21/6118* (2013.01); *H04N 21/6168* (2013.01)

(58) Field of Classification Search
  CPC . H04H 20/78; H04L 12/2801; H04L 12/2838; H04L 12/2898
  See application file for complete search history.

(56) References Cited

U.S. PATENT DOCUMENTS

| | | |
|---|---|---|
| 2010/0100918 A1 | 4/2010 | Egan, Jr. et al. |
| 2011/0010749 A1 | 1/2011 | Alkan |
| 2011/0181371 A1* | 7/2011 | Alkan ............... H04L 12/2838 |
| | | 333/132 |
| 2012/0212305 A1* | 8/2012 | Shafer ............... H03H 7/0115 |
| | | 333/174 |
| 2015/0207525 A1 | 7/2015 | Li |
| 2016/0173054 A1 | 6/2016 | Alkan et al. |
| 2018/0007318 A1 | 1/2018 | Bailey et al. |
| 2019/0074904 A1* | 3/2019 | Lin ..................... H04N 7/104 |

OTHER PUBLICATIONS

Thomas, Shane (Authorized Officer), International Search Report and Written Opinion dated Mar. 26, 2019, PCT Application No. PCT/US2019/013643, pp. 1-10.

* cited by examiner

REFLECTION-LESS IN-HOME NETWORK ADAPTER

CROSS-REFERENCE TO RELATED APPLICATIONS

This application is a continuation of U.S. patent application Ser. No. 16/248,241, which claims priority to U.S. Provisional Patent Application No. 62/618,224, filed on Jan. 17, 2018, and U.S. Provisional Patent Application No. 62/684,579, filed on Jun. 13, 2018. The entirety of these applications is incorporated by reference herein.

BACKGROUND

Typical legacy splitters or power dividers that are used in cable television (CATV) and multimedia over coax alliance (MoCA) networks have predominantly used ferrite transformers to provide a broadband circuit with low input-to-output loss and high output-to-output isolation. These ferrite splitter circuits are structured in many different ways to include additional intermediate circuits to achieve acceptable in-home performance for the CATV bandwidths (e.g., 5-1002 MHz) and MoCA bandwidths (e.g., 1125-1675 MHz). In such ferrite core splitters, however, the extension of bandwidth and/or the addition of intermediate circuits both increase input-to-output losses and have high isolation in the output-to-output MoCA band with notches that may cause loss of in-band signals. The notches are prevalent in both the CATV and MoCA bandwidths. The notches are amplified by circuit mismatches and altering intra-device line lengths. Therefore, it would be desirable to have a new reflection-less adapter that will absorb or attenuate the out-of-band signals, preventing such transmitted or reflected signals from introducing noise into a coupled access or CATV network.

SUMMARY

A system includes a first device. The first device includes a first input. The first device also includes a first splitter configured to connect to the first input. The first device also includes a first diplexer having a first common port, a first high-pass filter, and a first low-pass filter. A first output of the first splitter is configured to connect to the first common port. The first device also includes a second diplexer having a second common port, a second high-pass filter, and a second low-pass filter. The first high-pass filter is configured to connect to the second high-pass filter. The first low-pass filter is configured to connect to the second low-pass filter. The first device also includes a first diode configured to connect to and be positioned between the first and second high-pass filters. The first device also includes a second diode configured to connect to and be positioned between the first and second low-pass filters. The first device also includes a third diplexer having a third common port, a third high-pass filter, and a third low-pass filter. The second common port is configured to connect to the third low-pass filter. The first device also includes a fourth diplexer having a fourth common port, a fourth high-pass filter, and a fourth low-pass filter. A second output of the first splitter is configured to connect to the fourth low-pass filter. The third high-pass filter is configured to connect to the fourth high-pass filter. The first device also includes a second splitter configured to connect to the third common port. The first device also includes a first output configured to connect to the fourth common port. The first device also includes a plurality of second outputs configured to connect to the second splitter. The system also includes a second device. The second device includes a second input configured to connect to one of the second outputs. The second device also includes a plurality of third outputs. Each third output is configured to connect to a customer premise equipment (CPE) device. The second device also includes an in-home network adapter configured to connect to and be positioned between the second input and the plurality of third outputs. The second device also includes a third splitter configured to connect to and be positioned between the in-home network adapter and the plurality of third outputs. The second device also includes a first resistor configured to connect to and be positioned between the in-home network adapter and the third splitter. The second device also includes a plurality of second resistors. One of the plurality of second resistors is configured to connect to and be positioned between the third splitter and each of the plurality of third outputs. The first diode is configured to allow signals to pass from the first high-pass filter to the second high-pass filter. The first diode is configured to prevent signals from passing from the second high-pass filter to the first high-pass filter. The second diode is configured to allow signals to pass from the second low-pass filter to the first low-pass filter. The second diode is configured to prevent signals from passing from the first low-pass filter to the second low-pass filter. The second input is configured to receive signals in a cable television (CATV) bandwidth and signals in a multimedia over coax alliance (MoCA) bandwidth from the first device. The in-home network adapter includes a fifth diplexer having a fifth high-pass filter and a fifth low-pass filter. The in-home network adapter is configured to allow the signals in the MoCA bandwidth to pass from the second input to the plurality of third outputs and from the plurality of third outputs to the second input. The in-home network adapter is configured to attenuate or prevent the signals in the CATV bandwidth from passing from the second input to the plurality of third outputs, from the plurality of third outputs to the second input, or both. The in-home network adapter is configured to cause a return loss at the second input to be greater than 20 dB in the CATV bandwidth and from about 5 dB to about 20 dB in the MoCA bandwidth without a bridge circuit. The in-home network adapter is configured to cause a return loss at one of the plurality of third outputs to be from about 0 dB to about 45 dB in the CATV bandwidth and from about 18 dB to about 42 dB in the MoCA bandwidth without the bridge circuit. The in-home network adapter is configured to cause an insertion loss between the second input and the one of the plurality of third outputs to be greater than about 40 dB in the CATV bandwidth and from about 15 dB to about 25 dB in the MoCA bandwidth without the bridge circuit. The first resistor has a lesser resistance than each of the second resistors to minimize a through-loss of the second device. Each of the plurality of second resistors has a substantially equal resistance.

In another embodiment, the system includes an input. The system also includes a plurality of outputs. Each output is configured to connect to a customer premise equipment (CPE) device. The system also includes an in-home network adapter configured to connect to and be positioned between the input and the plurality of outputs. The system also includes a splitter configured to connect to and be positioned between the in-home network adapter and the plurality of outputs. The system also includes a first resistor configured to connect to and be positioned between the in-home network adapter and the splitter. The system also includes a plurality of second resistors. One of the plurality of second resistors is configured to connect to and be positioned between the splitter and each of the plurality of outputs. The input is configured to receive signals in a cable television (CATV) bandwidth and signals in a multimedia over coax alliance (MoCA) bandwidth. The in-home network adapter includes a diplexer comprising a high-pass filter and a low-pass filter. The in-home network adapter is configured to allow the signals in the MoCA bandwidth to pass from the input to the plurality of outputs and from the plurality of outputs to the input. The in-home network adapter is configured to attenuate or prevent the signals in the CATV bandwidth from passing from the input to the plurality of outputs, from the plurality of outputs to the input, or both. The in-home network adapter is configured to cause a return loss at the input to be greater than 20 dB in the CATV bandwidth and from about 5 dB to about 20 dB in the MoCA bandwidth without a bridge circuit. The first resistor has a lesser resistance than each of the second resistors to minimize a through-loss between the input and the plurality of outputs. Each of the plurality of second resistors has a substantially equal resistance.

In yet another embodiment, the system includes an input. The system also includes a plurality of outputs. Each output is configured to connect to a customer premise equipment (CPE) device. The system also includes an in-home network adapter configured to connect to and be positioned between the input and the plurality of outputs. The system also includes a splitter configured to connect to and be positioned between the in-home network adapter and the plurality of outputs. The input is configured to receive signals in a cable television (CATV) bandwidth and signals in a multimedia over coax alliance (MoCA) bandwidth. The in-home network adapter includes a diplexer having a high-pass filter and a low-pass filter. The in-home network adapter is configured to allow the signals in the MoCA bandwidth to pass from the input to the plurality of outputs and from the plurality of outputs to the input. The in-home network adapter is configured to attenuate or prevent the signals in the CATV bandwidth from passing from the input to the plurality of outputs, from the plurality of outputs to the input, or both. The in-home network adapter is configured to cause a return loss at the input to be in a first predetermined range in the CATV bandwidth and in a second predetermined range in the MoCA bandwidth without a bridge circuit.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DETAILED DESCRIPTION

Figure 1:
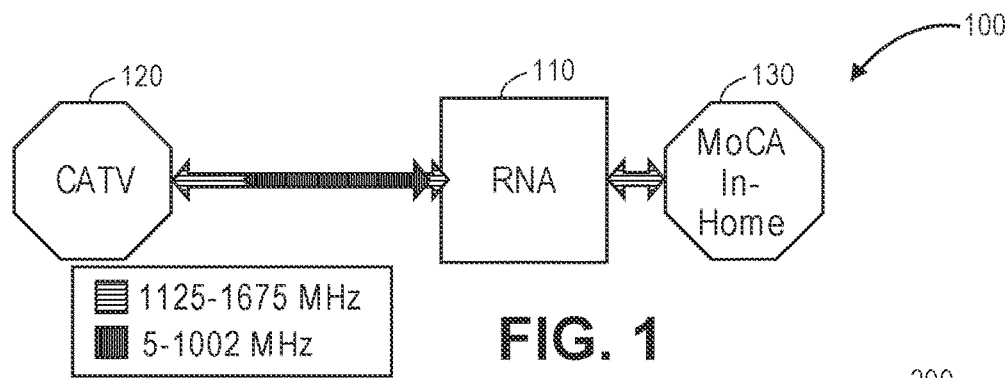
FIG. 1 illustrates a schematic view of a reflection-less in-home network adapter (RNA) passing in-home (e.g., MoCA) signals and absorbing and/or attenuating non-in-home (e.g., CATV) signals, according to an embodiment.

Embodiments of the present disclosure may provide a reflection-less in-home network adapter (RNA), which is a circuit that allows an in-home network device or splitter to couple to another device or splitter for effective coupling of the in-home network signals (e.g., in the MoCA bandwidth). The RNA may also provide (e.g., complete) isolation of the non-in-home network signals (e.g., the CATV access network signals and/or noise). The RNA may provide isolation in a number of ways more desirable than with the use of a reflective filter, and thus, in some embodiments, the reflective filter may be omitted. The RNA creates a path that absorbs, attenuates, or terminates the CATV access signals (i.e., non-in-home signals) from reflecting at the input or transmitting through from the output to the input to prevent them from creating interference reflections back into the coupled network. The coupled network is the "CATV access network" which is coupled at the output of an access network device (such as a MoCA amplifier or splitter) and the input on an in-home network device. The RNA passes the in-home signals.

The RNA may be used to couple the CATV network and the MoCA (i.e., in-home) network, which is new to the industry because the industry is transitioning to a more isolated in-home network architecture, which includes MoCA-only devices and isolation from the CATV access network. In the past, coupling or cascading devices typically passed all of the CATV and MoCA network signals, for example, using a CATV/MoCA entry amplifier and a passive CATV/MoCA splitter. The RNA may be used in the conventional ferrite-based CATV/MoCA splitter devices and in in-home-only resistive splitter devices to improve service and coupling between the networks. The RNA minimizes or eliminates interference and noise signals.

The RNA may create a coupling or common point where an in-home splitter can adapt to existing access equipment that also passes the MoCA signals. One way to accomplish this is to first pass the high-frequency (e.g., MoCA) signals but not the low-frequency (e.g., CATV) signals in the upstream direction. This may help with noise mitigation. Secondly, because the access network passes all frequencies, it needs a good match at all frequencies. The RNA may absorb, attenuate, or terminate the low-frequency (e.g., CATV) signals so that they are not passed into the in-home network. This may prevent reflections outside the in-home network. Thus, when the two networks are attached together with the RNA positioned therebetween, neither network is disrupted. The RNA also helps to maintain good return loss and minimize interference. This is shown in more detail in FIGS. 12 and 13, which are discussed below.

In an embodiment, the RNA may be constructed with a diplexer that terminates the low frequency band into a matched terminator. The RNA may also incorporate an attenuator in the low frequency band. The low frequency band may be an isolated output or a coupled output. The high-pass section may provide adequate rejection to block ingress noise.

FIG. 1 illustrates a schematic view of a system 100 including a RNA 110, according to an embodiment. The RNA 110 may be connected to and positioned between a CATV device 120 and a MoCA in-home device 130. The CATV device 120 may be or include an active entry device that passes back and forth non-in-home signals in the CATV bandwidth (e.g., 5-1002 MHz). When the RNA 110 is added to the system 100, the in-home signals in the MoCA bandwidth (e.g., 1125-1675 MHz) may travel in both directions through the RNA 110. In other words, the signals in the MoCA bandwidth may travel from the CATV device 120, through the RNA 110, and to the MoCA in-home device 130, and from the MoCA in-home device 130, through the RNA 110, and to the CATV device 120. However, when the RNA 110 is added to the system 100, the non-in-home signals or noise in the CATV bandwidth are absorbed or terminated in/by the RNA 110 and thus do not travel in the (e.g., upstream) direction toward the CATV device 120. In addition, the CATV band signals are not reflected back into the CATV device 120.

Figure 2:
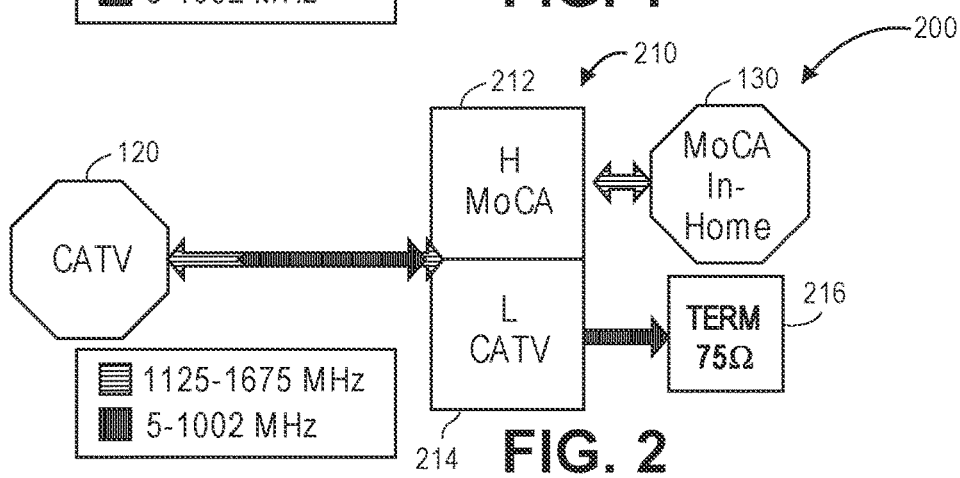
FIG. 2 illustrates a schematic view of an RNA with a terminated low-pass filter, according to an embodiment.

FIG. 2 illustrates a schematic view of a system 200 including a RNA 210 with a terminated low-pass filter 214, according to an embodiment. In this embodiment, the RNA 210 may be or include a diplexer including a high-pass filter 212 and a low-pass filter 214. The in-home signals in the MoCA bandwidth may travel in both directions through the RNA 210. More particularly, the signals in the MoCA bandwidth may travel from the CATV device 120, through the high-pass filter 212 of the RNA 210, and to the MoCA in-home device 130, and from the MoCA in-home device 130, through high-pass filter 212 of the RNA 210, and to the CATV device 120. The non-in-home signals in the CATV bandwidth may travel in a first (e.g., downstream) direction from the CATV device 120, through the low-pass filter 214. There, the low-pass filter 214 may be terminated (e.g., with a 75 ohm resistor 216). The non-in-home signals in the CATV bandwidth may not travel in a second (e.g., upstream) direction through the RNA 210.

Figure 3:
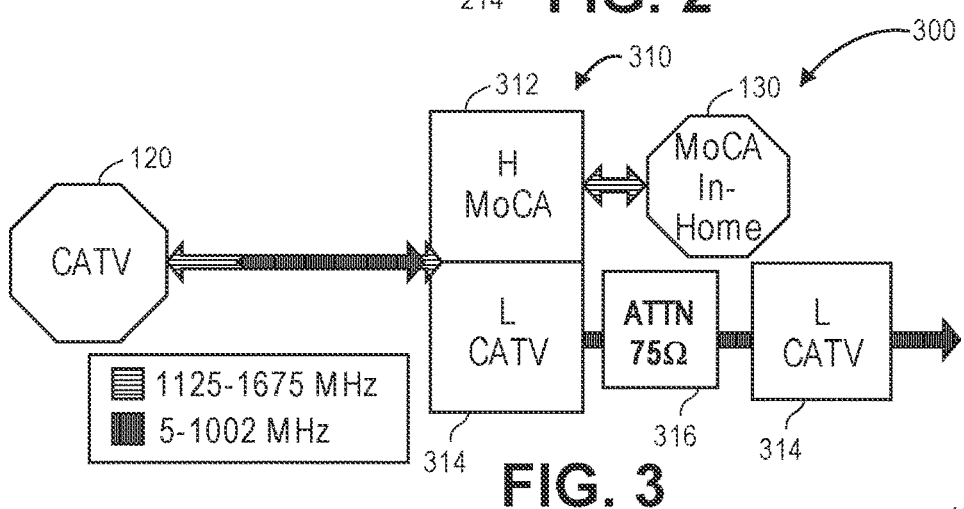
FIG. 3 illustrates a schematic view of an RNA with a low-pass filter incorporating an attenuation circuit, according to an embodiment.

FIG. 3 illustrates a schematic view of a system 300 including a RNA 310 with a low-pass filter 314 incorporating an attenuation circuit 316, according to an embodiment. As in FIG. 2, the RNA 310 in FIG. 3 may be or include a diplexer. In this embodiment, the outputs of the high-pass filter 312 and the low-pass filter 314 are isolated from one another. The low-pass filter 314 of the RNA 310 may include an attenuation circuit (e.g., including a 75 ohm resistor) 316. The attenuation circuit 316 may attenuate the non-in-home signals in the CATV bandwidth that pass through the low-pass filter 314 of the RNA 310 (and the attenuation circuit 316) to the point where there are no reflections and no return (e.g., upstream) signal.

Figure 4:
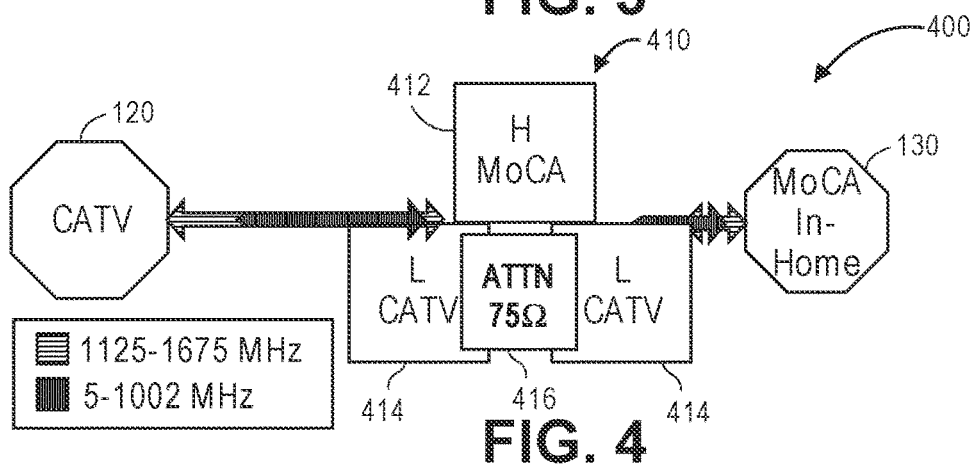
FIG. 4 illustrates another schematic view of an RNA with a low-pass filter incorporating an attenuation circuit, according to an embodiment.

FIG. 4 illustrates a schematic view of another system 400 including a RNA 410 with a low-pass filter 414 incorporating an attenuation circuit 416, according to an embodiment. As in FIG. 3, the RNA 410 in FIG. 4 may be or include a diplexer, and the low-pass filter 414 may include an attenuation circuit 416. However, unlike the RNA 310 in FIG. 3, the high-pass filter 412 and the low-pass filter 414 in the RNA 410 in FIG. 4 may have a common input and a common output. In other words, the high-pass filter 412 and the low-pass filter 414 may be connected in parallel.

Figure 5:
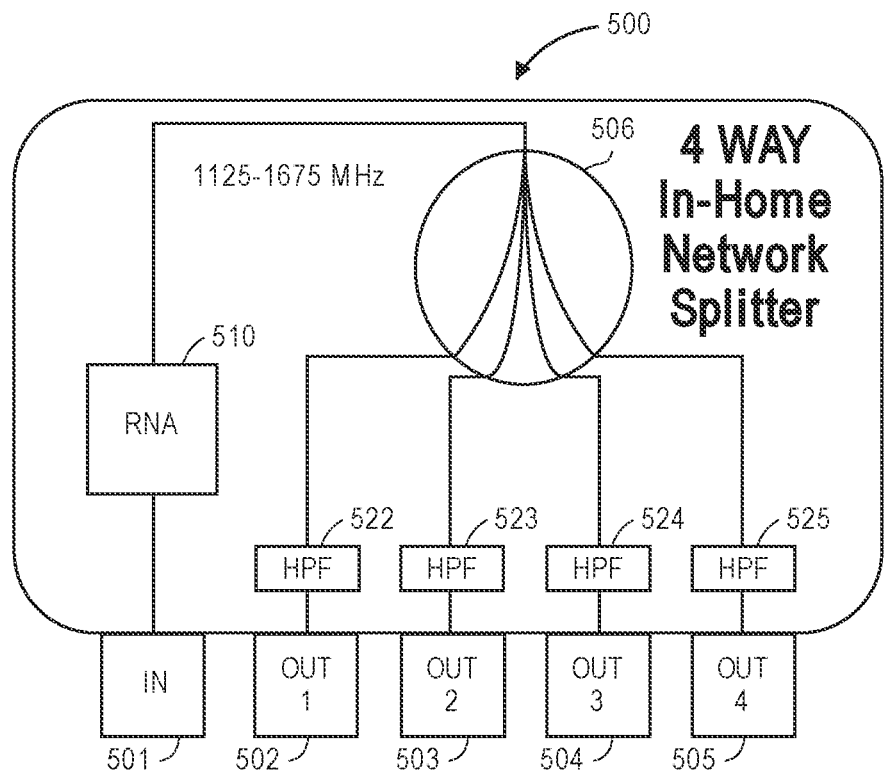
FIG. 5 illustrates a schematic view of a ferrite CATV/MoCA splitter that includes a RNA, according to an embodiment.

FIG. 5 illustrates a schematic view of a ferrite CATV/MoCA splitter 500 that includes a RNA 510, according to an embodiment. The splitter 500 may be or include an in-home-only splitter either resistive or a ferrite core or any combination thereof. The splitter 500 may include an input 501 and a plurality of outputs (four are shown: 502-505). The RNA 510 may be connected to and positioned between the input port 501 and a common node 506 of the in-home splitter. Additionally, the RNA 510 may be configured in the same orientation external to the input port 501. The RNA 510 may absorb and prevent interference on the access side (e.g., connected to the input 501) and also mitigate noise and low frequencies from leaving the in-home side (e.g., connected to the outputs 502-505). Thus, the RNA 510 may preserve return loss.

HPFs 522-525 may be used at the outputs 502-505 to further isolate low frequency noise, surge, and ESD. The RNA 510 may also prevent reflections at the input 501 in the CATV band when the HPFs 502-505 are used at the outputs 502-505. In addition, the RNA 510 may mitigate noise and/or suppress in-home noise in the CATV band from being transmitted through the input 501 with or without the use of the HPFs 522-525 at the outputs 502-505. The HPFs 522-525 may be any combination of series DC-blocking capacitance and shunt coils. The RNA 510 may be used to prevent reflections in the CATV band.

Figure 6:
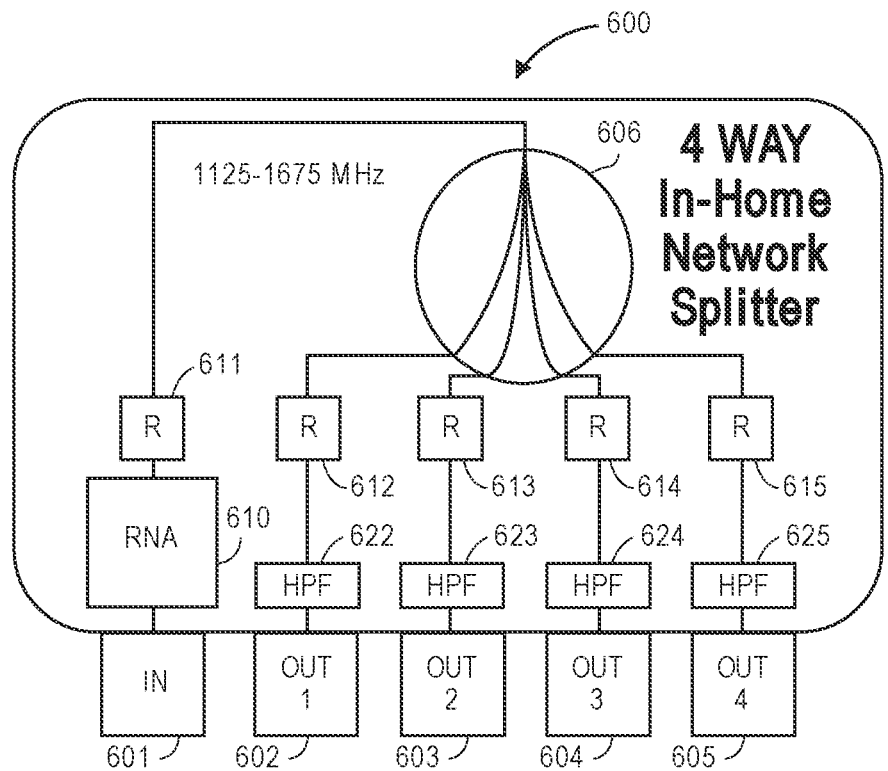
FIG. 6 illustrates a schematic view of an in-home-only resistive splitter that includes a RNA, according to an embodiment.

FIG. 6 illustrates a schematic view of an in-home-only resistive splitter 600 that includes an RNA 610, according to an embodiment. The splitter 600 may be or include an in-home-only resistive wye-type splitter. Thus, the splitter 600 may include a resistor 611 connected to and positioned between the RNA 610 and the common node 606, and a resistor 612-615 positioned between the common node 606 and each output 602-605. The resistors 611-615 may all have a substantially equal value (e.g., 45 ohms). In at least one embodiment, the value of the resistor 611 may be minimized, or the resistor 611 may be omitted/removed, to minimize insertion loss between the input 601 and any of the outputs 602-605.

HPFs 622-625 may be used at the outputs 602-605 to further isolate low frequency noise, surge, and ESD. The RNA 610 may also prevent reflections at the input 601 in the CATV band when the HPFs 602-605 are used at the outputs 602-605. In addition, the RNA 610 may mitigate noise and/or suppress in-home noise in the CATV band from being transmitted through the input 601 with or without the use of the HPFs 622-625 at the outputs 602-605. The HPFs 622-

625 may be any combination of series DC-blocking capacitance and shunt coils. The RNA 610 may be used to prevent reflections in the CATV band.

Figure 7:
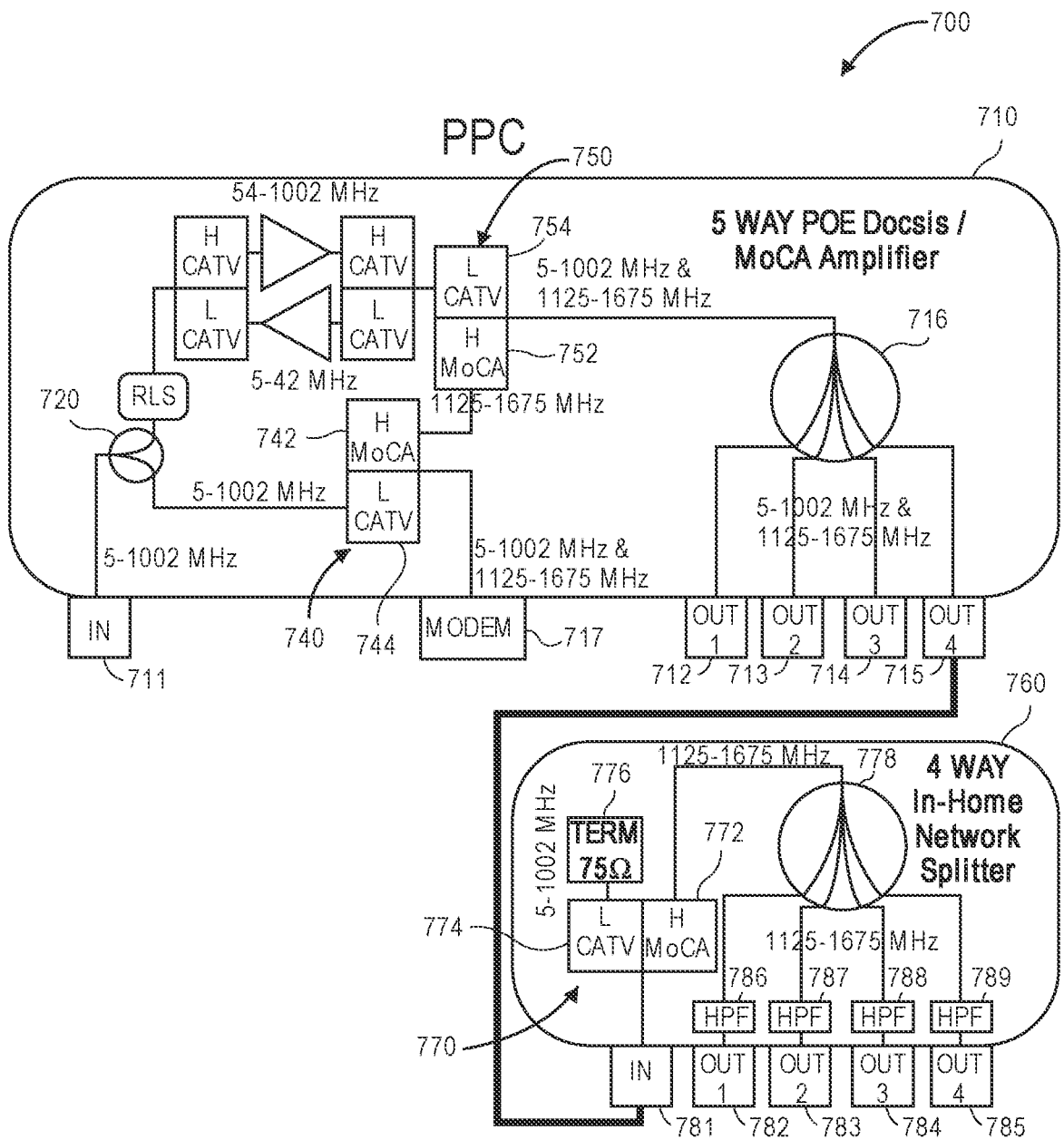
FIG. 7 illustrates a schematic view of a system including an amplifier and an in-home network splitter, according to an embodiment.

FIG. 7 illustrates a schematic view of a system 700 including an amplifier 710 and a (e.g., 4-way) in-home network splitter 760, according to an embodiment. The amplifier 710 may be or include a 5-way (POE) docsis/MoCA amplifier. The amplifier 710 may be an access/in-home device. The amplifier 710 may pass all upstream and downstream signals to the CATV headend and pass MoCA signals between every output port. Coupling the dedicated in-home splitter 760 to the amplifier 710 may generate adverse effects (e.g., let noise pass through or cause CATV band reflections). To prevent these adverse effects, an RNA 770 is shown in the splitter 760. The amplifier MoCA diplexers are MoCA bridging/POE diplex filters, rather than in-home reflection-less network adapters. They do not absorb or attenuate the signals in the CATV bandwidth.

The signals in the CATV and MoCA bandwidths that exit the output 715 of the amplifier 710 may be introduced into the input 781 of the splitter 760, where they are then introduced into the RNA 770. The signals in the CATV bandwidth may pass through the low-pass filter 774 of the third RNA 770 and terminate in a matched terminator (e.g., including a 75 ohm resistor) 776. This may maintain a good match on the amplifier 710. The signals in the MoCA bandwidth may pass through the high-pass filter 772 of the RNA 770 before being split and introduced to the outputs 782-785 of the splitter 778. The RNA 770 may be used between CATV/MoCA amplifiers and ferrite CATV/MoCA splitter devices or between CATV/MoCA amplifiers and in-home-only resistive splitter devices.

HPFs 786-789 may be used at the outputs 782-785 to further isolate low frequency noise, surge, and ESD. The HPFs 786-789 may be any combination of series DC-blocking capacitance and shunt coils.

Figure 8:
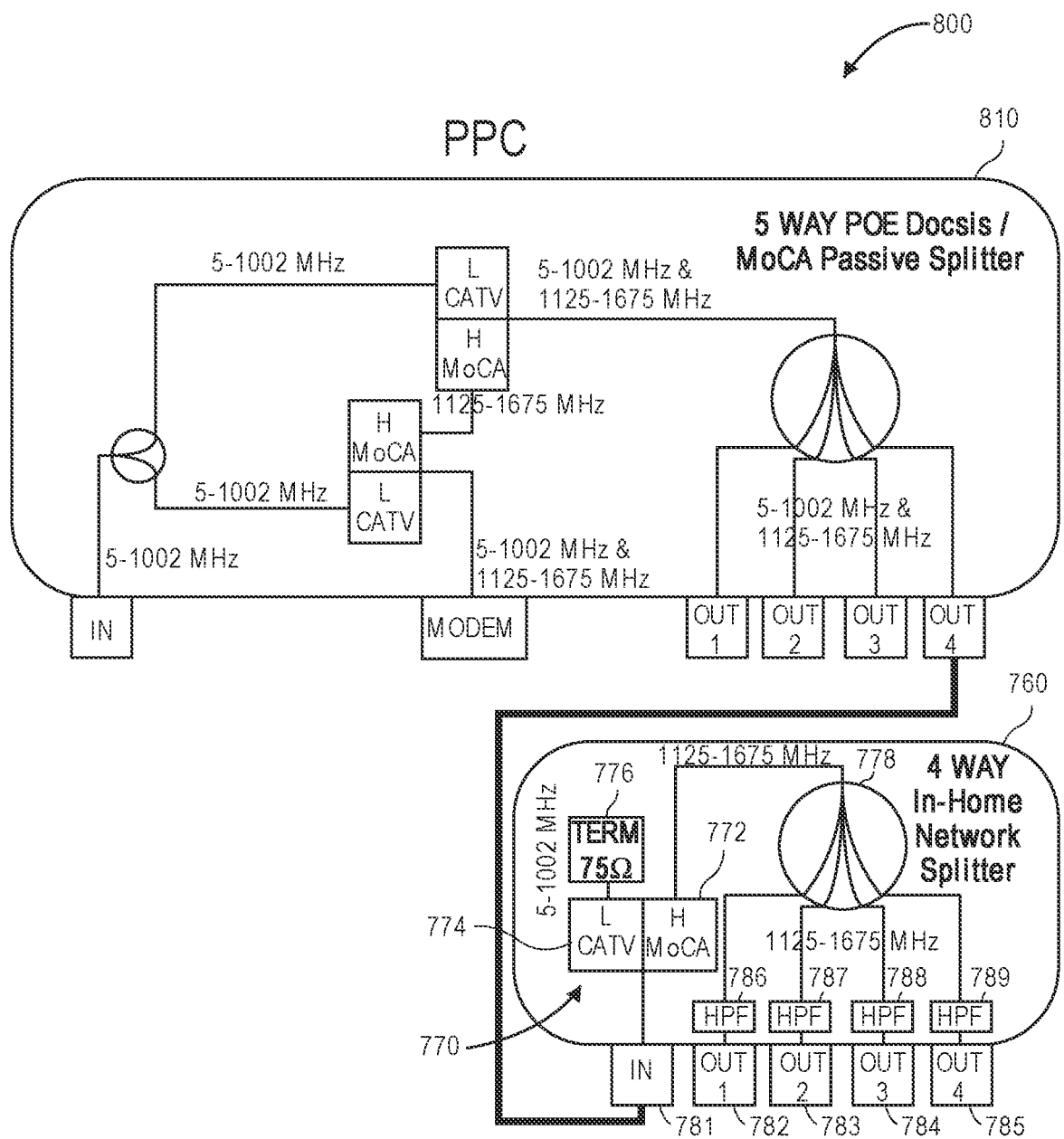
FIG. 8 illustrates a schematic view of a system including a passive splitter and an in-home network splitter, according to an embodiment.

FIG. 8 illustrates a schematic view of a system 800 including a passive splitter 810 and the (e.g., 4-way) in-home network splitter 760, according to an embodiment. The passive splitter 810 may be or include a 5-way point-of-entry (POE) docsis/MoCA passive splitter. The passive splitter 810 may pass all access to all ports, and MoCA between all outputs and may be stopped/blocked at the diplexers where it is reflected back by the low-pass filter sections. As a result, when the dedicated in-home-only network splitter 760 is connected to the passive splitter 810, the RNA 770 may preserve both networks. The RNA 770 input has an impedance match (e.g., return loss>18 dB) in the CATV band with the access splitter outputs preventing interference reflections. The RNA 770 input may have an industry standard impedance match (e.g., return loss>5 dB) in the MoCA band with the access splitter outputs preventing interference reflections in either direction.

The (e.g., 4-way) in-home network splitter 760 may be the same as in FIG. 7. The CATV signals pass upstream (i.e., from the customer premises equipment (CPE) access device) and downstream (i.e., from the headend CMTS) between the input and output of the access splitter 810) where they are coupled to the input of the in-home-only network splitter 760 and absorbed or attenuated in the low pass section of the RNA 770 to prevent interference reflections. The MoCA signals pass between the outputs of the access splitter 810 (i.e., from/to CPE access devices such as: modems, gateways, DVRs) where they are coupled to the input of the in-home-only network splitter 760 and passed through the high pass section of the RNA 770 to and between all outputs 782-785 of the in-home-only network splitter 760 (i.e., from/to CPE such as: STBs stet top boxes, digital television adapters (DTAs)). The CPE set top boxes may be 100% MoCA-only or both CATV and MoCA capable. Both will work, however, when deployed in an in-home MoCA only architecture. In this instance, only the MoCA features will function.

Figure 9:
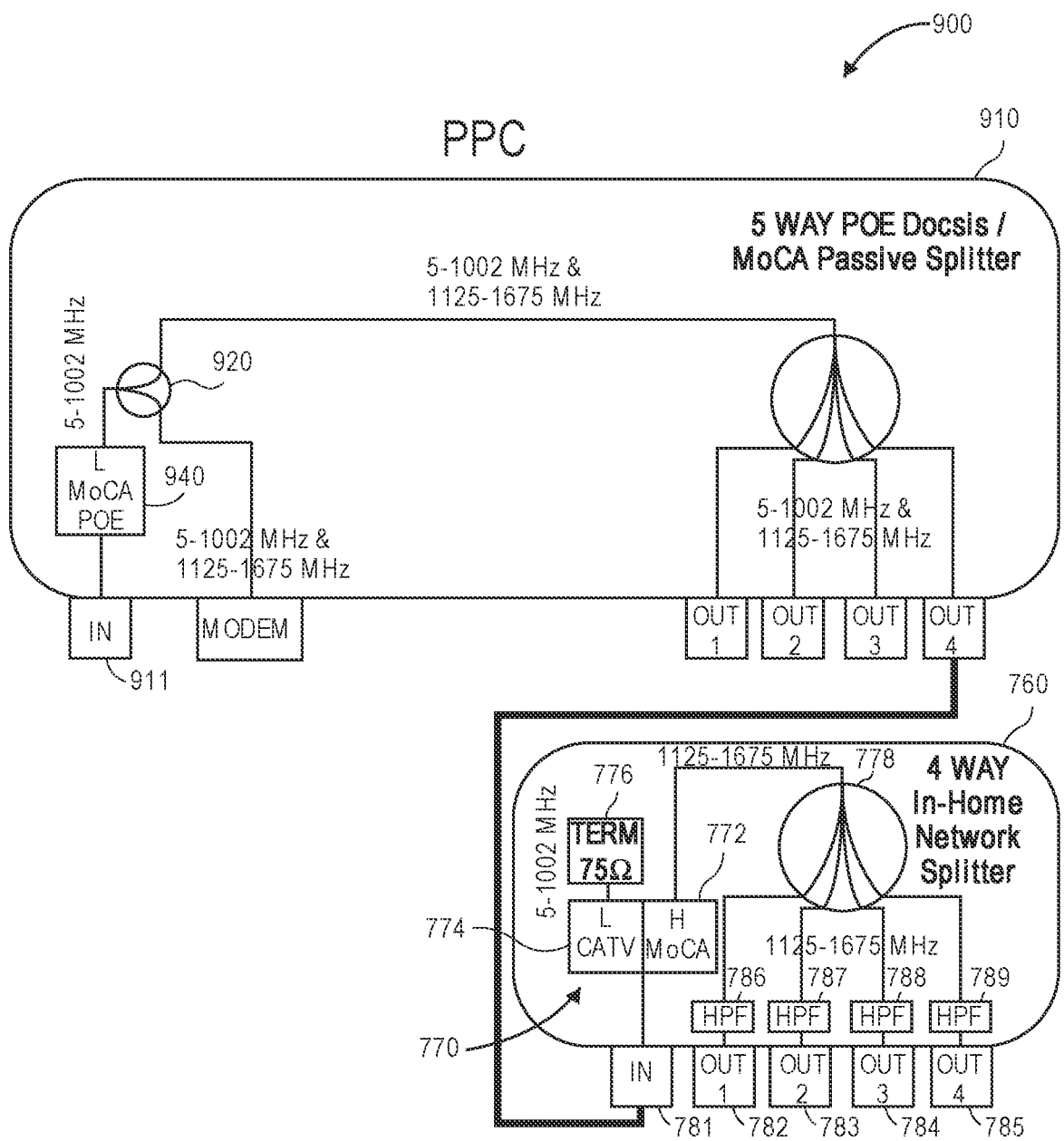
FIG. 9 illustrates a schematic view of another system including a passive splitter and an in-home network splitter, according to an embodiment.

FIG. 9 illustrates a schematic view of another system 900 including a passive splitter 910 and the (e.g., 4-way) in-home network splitter 760, according to an embodiment. The passive splitter 910 may be or include a 5-way POE docsis/MoCA passive splitter. The passive splitter 910 may include a low-pass MoCA POE filter 940 connected between the input 911 and the two-way splitter 920. This qualifies the passive splitter 910 as a passive entry splitter employed at the demarcation or drop point of the customer premises. The operation and signal flow of the passive splitter 910 is very similar to that of passive splitter 810 with the difference being the MoCA signal reflection point is located at the POE LPF 940 rather than the POE MoCA diplexers 740, 750. The (e.g., 4-way) in-home network splitter 760 may be the same as in FIGS. 7 and 8.

Figure 10:
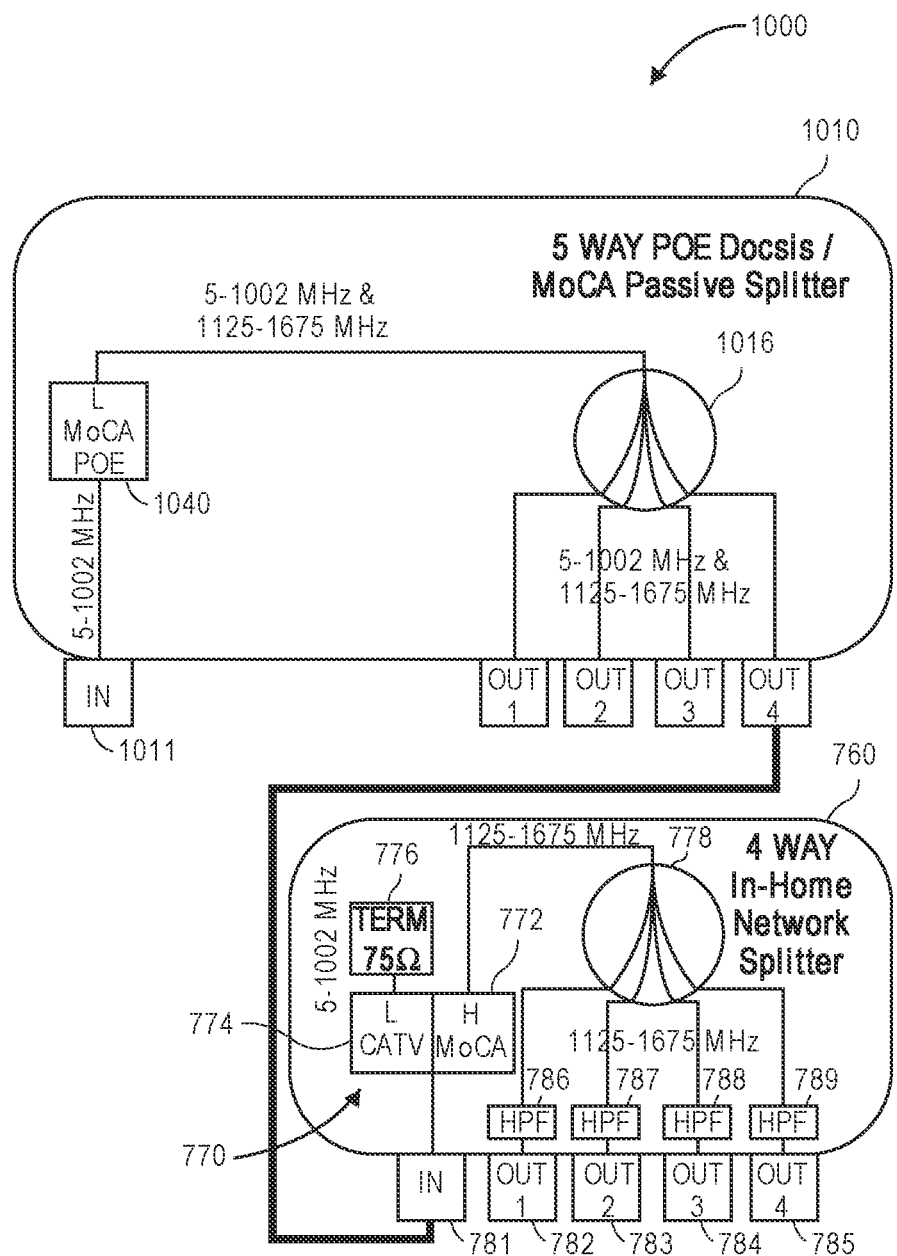
FIG. 10 illustrates a schematic view of another system including a passive splitter and an in-home network splitter, according to an embodiment.

FIG. 10 illustrates a schematic view of another system 1000 including a passive splitter 1010 and a (e.g., 4-way) in-home network splitter 760, according to an embodiment. The passive splitter 1010 may be or include a 5-way POE docsis/MoCA passive splitter. The modem and the two-way splitter of FIGS. 7-9 may be omitted in this embodiment. The low-pass MoCA POE filter 1040 may be employed external to the input 1011 of the splitter 1010. When the low-pass MoCA POE filter 1040 is employed external to the input 1011 of the passive splitter 1010, this qualifies the passive splitter 1010 as a passive entry splitter employed at the demarcation or drop point of the customer premises. The operation and signal flow of the passive splitter 1010 is similar to that of passive splitter 810 with the difference being that the MoCA signal reflection point is located at the POE LPF 1040 rather than at the POE MoCA diplexers 740, 750. The (e.g., 4-way) in-home network splitter 760 may be the same as in FIGS. 7-9.

Figure 11:
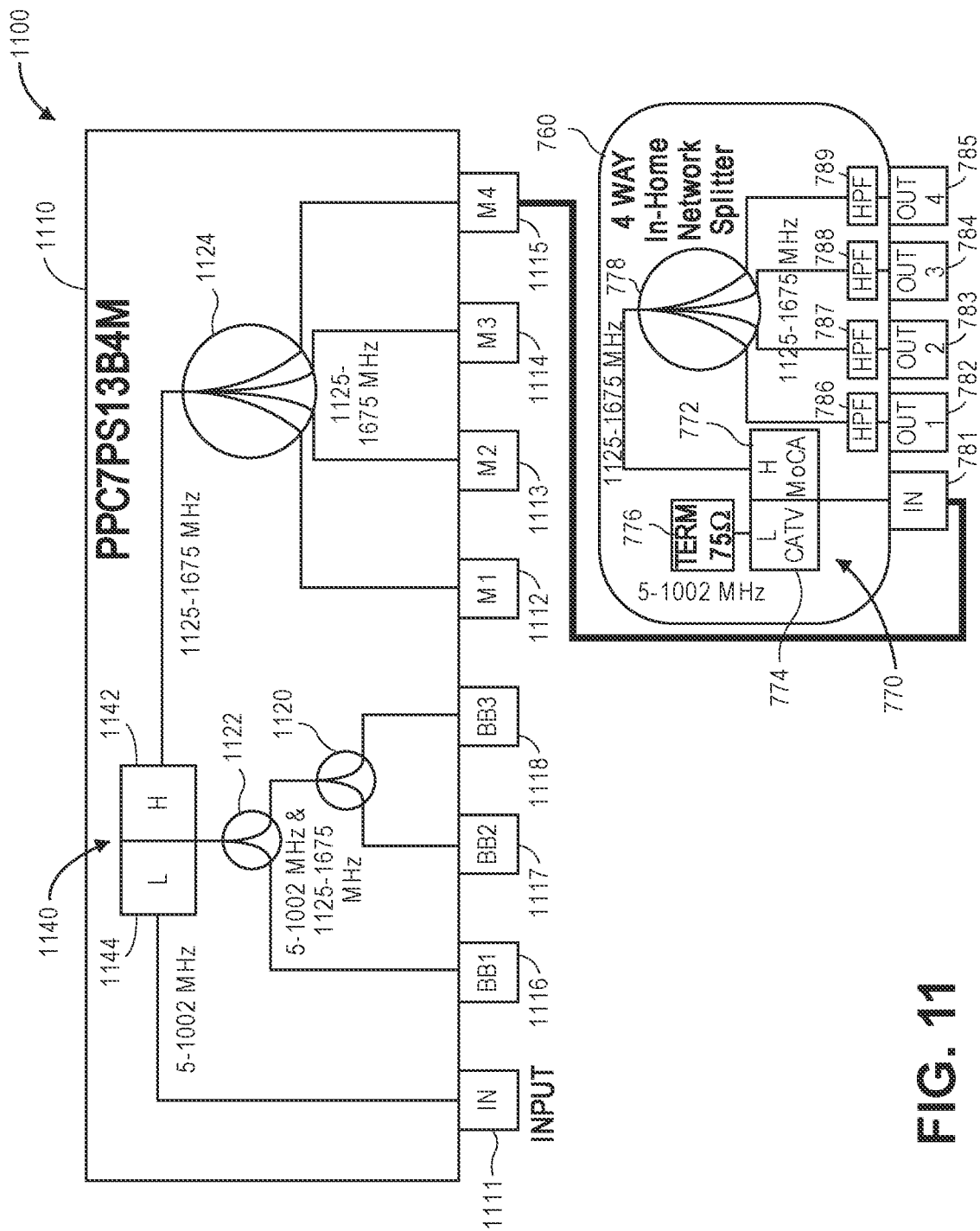
FIG. 11 illustrates a schematic view of a system including a 7-way passive splitter and an in-home network splitter, according to an embodiment.

FIG. 11 illustrates a schematic view of a system 1100 including a 7-way POE docsis/MoCA passive splitter 1110 and the (e.g., 4-way) in-home network splitter 760, according to an embodiment. The 7-way passive splitter 1110 may include an input port 1111, one or more dedicated in-home MoCA ports (four are shown: 1112-1115), and one or more CATV/MoCA access ports (three are shown: 1116-1118) capable of being used for transmitting signals in the in-home MoCA bandwidth and in the CATV bandwidth.

A two-way splitter 1120 may be connected to the ports 1117, 1118. Another two-way splitter 1122 may be connected to the port 1116 and the two-way splitter 1120. A diplexer 1140 may have a low-pass filter 1144 connected to the input 1111, a common port connected to the two-way splitter 1122, and a high-pass filter 1142 connected to a four-way splitter 1124, which is connected to the ports 1112-1115. The diplexer 1140 may allow signals in the in-home MoCA bandwidth to traverse through the high-pass filter 1142 and common port, and through the two-way splitters 1120, 1122. The two-way splitters 1120, 1122 may be ferrite or resistive. Various configurations may include either a direct coupling between the common node of the diplexer 1140 to a CATV/MoCA access port 1116 and/or a cascaded combination of ferrite and/or resistive splitters coupled between the common node of diplexer 1140 to one or more CATV/MoCA access ports 1116-1118. More particularly, access networks may use ferrite splitters, and in-home networks may use resistive splitters. When the low-pass section 1144 of the MoCA POE diplexer 1042 is employed with the low-pass section 1144 coupled to the input of the 7-way POE docsis/MoCA passive splitter 1110, it qualifies the splitter 1110 as a passive entry splitter employed at the demarcation or drop point of the customer premises. The operation and signal flow of 7-way POE docsis/MoCA passive splitter 1110 is similar to that of passive splitter 810 with the difference being the MoCA signal reflection point located at the POE LPF section 1144 rather than the POE MoCA diplexers 740, 750.

Figure 12:
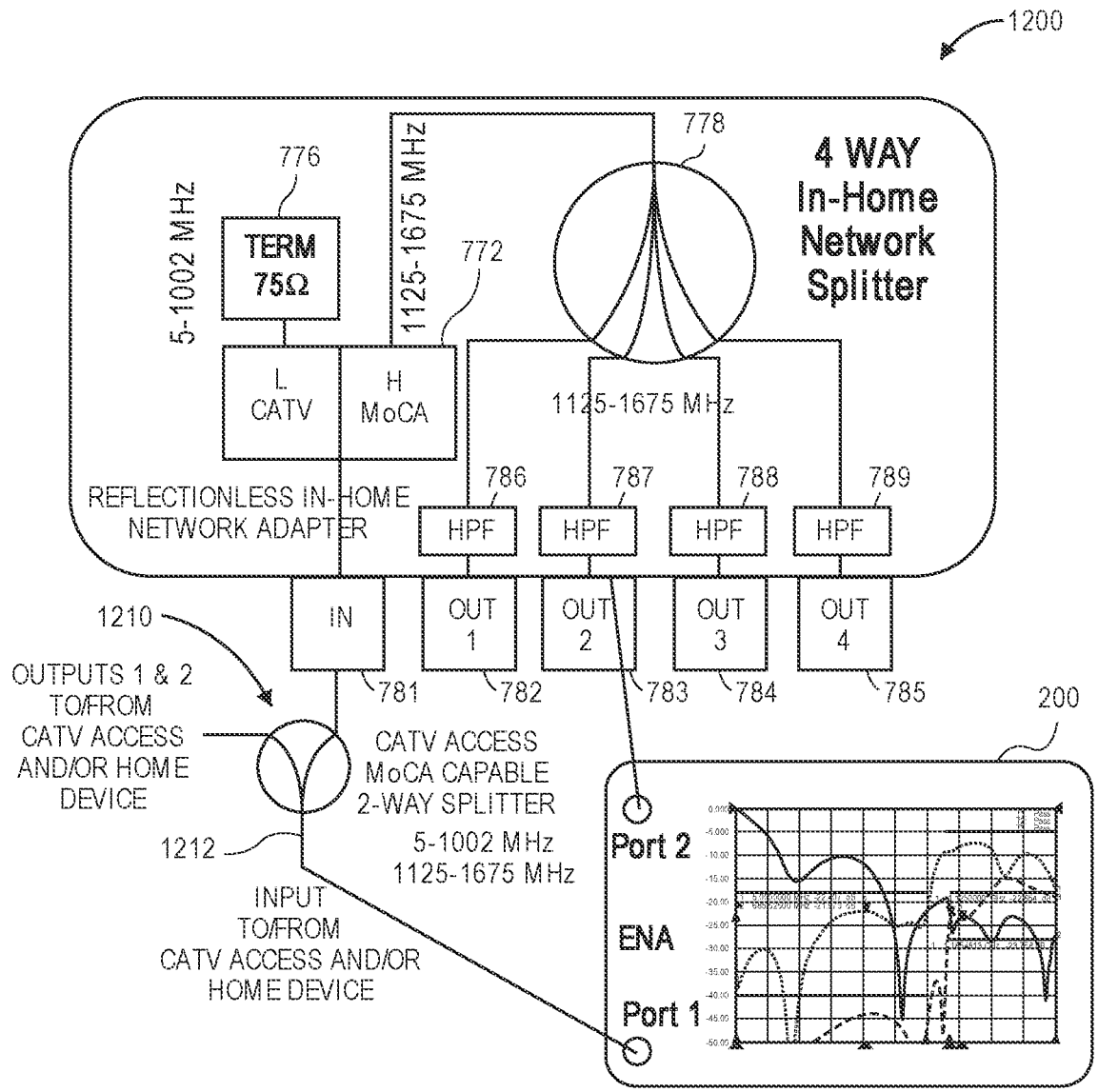
FIG. 12 illustrates a schematic view of the RNA circuit of FIG. 2 employed between an access network 2-way splitter and an in-home network 4-way splitter with HPF elements at the home ports, according to an embodiment. This may promote a good impedance match and reduce/prevent reflections in the CATV bandwidth.

FIG. 12 illustrates a schematic view of the RNA circuit 200 of FIG. 2 employed between an access network 2-way splitter 1210 and an in-home network 4-way splitter 760 with HPF elements 786-789 at the home ports 782-785, according to an embodiment.

Figure 13:
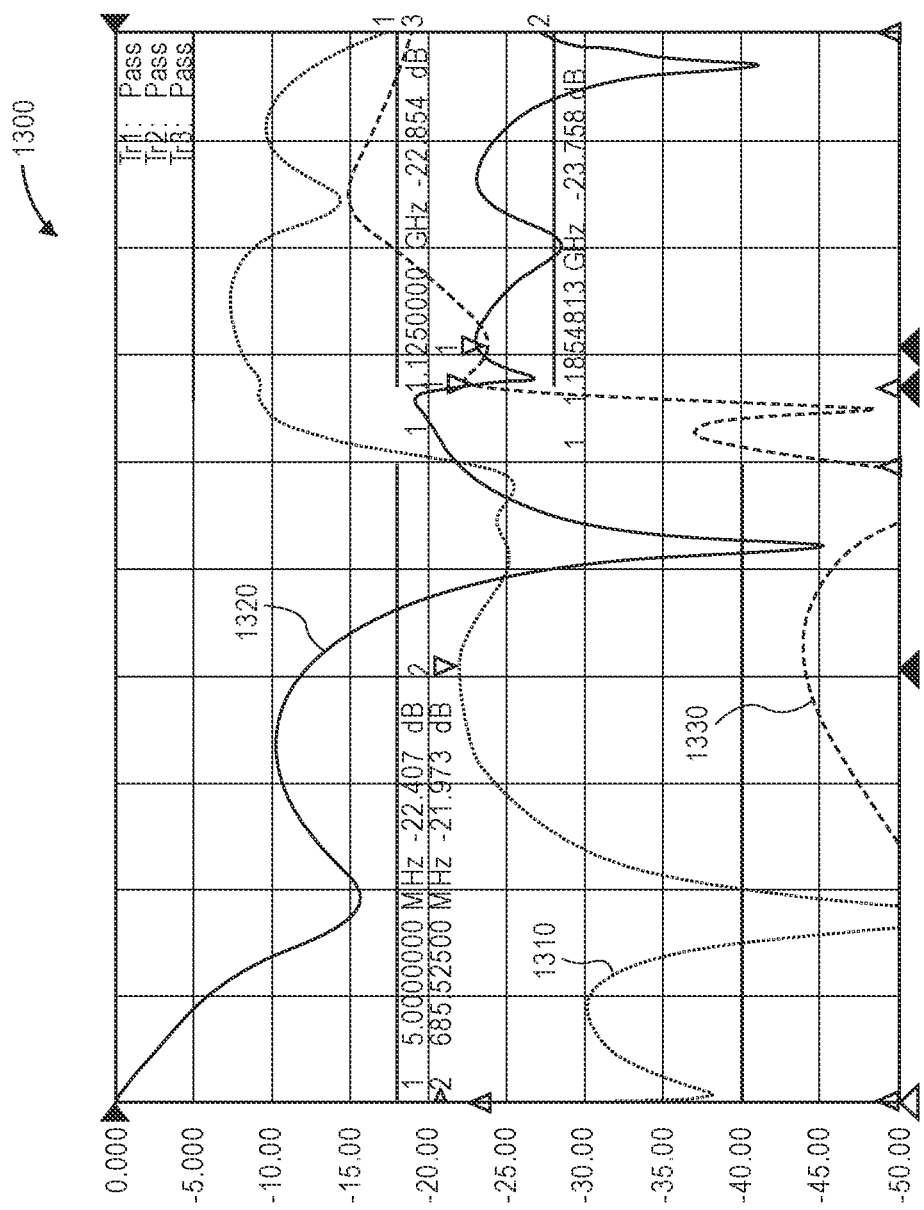
FIG. 13 illustrates a graph of a response of the RNA circuit of FIG. 12 between the 2-way access splitter and the 4-way in-home network splitter, according to an embodiment.

FIG. 13 illustrates a graph 1300 of a response of the RNA circuit 200 between the 2-way access splitter 1210 and the 4-way in-home network splitter 760, according to an embodiment. The first trace 1310 is an s11 reflection measurement or return loss at the access splitter input 1212. The first trace 1310 shows good return loss in the CATV band (e.g., >20 dB) and comparably good return loss in the MoCA band (e.g., >5 dB). There are no reflections from the input port 781 in the CATV access band (i.e., 5 MHz-1002 MHz) and minimal reflections in the MoCA band (i.e., 1125 MHz-1675 MHz).

The second trace 1320 is an s22 reflection measurement or return loss at the home splitter output 783. The second trace 1320 shows good return loss in the MoCA band and poor return loss or reflections low frequency noise due to HPF elements 786-789 at the home ports 782-785.

The third trace 1330 is an s21 transmission measurement or insertion loss between the access splitter input 1212 and home splitter output 783. The third trace 1330 shows good isolation in the CATV access band (e.g., >40 dB between 5 MHz and 1002 MHz) and good pass band isolation in the in-home MoCA band (e.g., <25 dB between 1125 MHz and 1675 MHz).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. A system, comprising:
    a first device comprising:
        a first input;
        a first splitter configured to connect to the first input;
        a first diplexer comprising a first common port, a first high-pass filter, and a first low-pass filter, wherein a first output of the first splitter is configured to connect to the first common port;

a second diplexer comprising a second common port, a second high-pass filter, and a second low-pass filter, wherein the first high-pass filter is configured to connect to the second high-pass filter, and wherein the first low-pass filter is configured to connect to the second low-pass filter;

a first diode configured to connect to and be positioned between the first and second high-pass filters;

a second diode configured to connect to and be positioned between the first and second low-pass filters;

a third diplexer comprising a third common port, a third high-pass filter, and a third low-pass filter, wherein the second common port is configured to connect to the third low-pass filter;

a fourth diplexer comprising a fourth common port, a fourth high-pass filter, and a fourth low-pass filter, wherein a second output of the first splitter is configured to connect to the fourth low-pass filter, wherein the third high-pass filter is configured to connect to the fourth high-pass filter;

a second splitter configured to connect to the third common port;

a first output configured to connect to the fourth common port; and a plurality of second outputs configured to connect to the second splitter; and a second device comprising:

a second input configured to connect to one of the second outputs;

a plurality of third outputs, wherein each third output is configured to connect to a customer premise equipment (CPE) device;

an in-home network adapter configured to connect to and be positioned between the second input and the plurality of third outputs;

a third splitter configured to connect to and be positioned between the in-home network adapter and the plurality of third outputs;

a first resistor configured to connect to and be positioned between the in-home network adapter and the third splitter;

a plurality of second resistors, wherein one of the plurality of second resistors is configured to connect to and be positioned between the third splitter and each of the plurality of third outputs;

wherein the first diode is configured to allow signals to pass from the first high-pass filter to the second high-pass filter;

wherein the first diode is configured to prevent signals from passing from the second high-pass filter to the first high-pass filter;

wherein the second diode is configured to allow signals to pass from the second low-pass filter to the first low-pass filter;

wherein the second diode is configured to prevent signals from passing from the first low-pass filter to the second low-pass filter;

wherein the second input is configured to receive signals in a cable television (CATV) bandwidth and signals in a multimedia over coax alliance (MoCA) bandwidth from the first device;

wherein the in-home network adapter comprises a fifth diplexer comprising a fifth high-pass filter and a fifth low-pass filter;

wherein the in-home network adapter is configured to allow the signals in the MoCA bandwidth to pass from the second input to the plurality of third outputs and from the plurality of third outputs to the second input;

wherein the in-home network adapter is configured to attenuate or prevent the signals in the CATV bandwidth from passing from the second input to the plurality of third outputs, from the plurality of third outputs to the second input, or both;

wherein the in-home network adapter is configured to cause a return loss at the second input to be greater than 20 dB in the CATV bandwidth and between about 5 dB and about 20 dB in the MoCA bandwidth without a bridge circuit;

wherein the in-home network adapter is configured to cause a return loss at one of the plurality of third outputs to be between about 0 dB and about 45 dB in the CATV bandwidth and between about 18 dB and about 42 dB in the MoCA bandwidth without the bridge circuit;

wherein the in-home network adapter is configured to cause an insertion loss between the second input and the one of the plurality of third outputs to be greater than about 40 dB in the CATV bandwidth and between about 15 dB and about 25 dB in the MoCA bandwidth without the bridge circuit;

wherein the first resistor has a lesser resistance than each of the second resistors to minimize a through-loss of the second device; and wherein each of the plurality of second resistors has a substantially equal resistance.

2. The system of claim 1, wherein the fifth high-pass filter and the fifth low-pass filter have a common input and a common output such that the fifth high-pass filter and the fifth low pass filter are connected in parallel.

3. The system of claim 1, wherein the fifth low-pass filter comprises two low-pass filter portions and an attenuator circuit that are connected in series with the attenuator circuit positioned between the two low-pass filter portions.

4. The system of claim 1, wherein the second device does not comprise the bridge circuit.

5. The system of claim 1, wherein the in-home network adapter does not comprise the bridge circuit.

6. A system, comprising:

an input;

a plurality of outputs, wherein each output is configured to connect to a customer premise equipment (CPE) device;

an in-home network adapter configured to connect to and be positioned between the input and the plurality of outputs;

a splitter configured to connect to and be positioned between the in-home network adapter and the plurality of outputs;

a first resistor configured to connect to and be positioned between the in-home network adapter and the splitter;

a plurality of second resistors, wherein one of the plurality of second resistors is configured to connect to and be positioned between the splitter and each of the plurality of outputs;

wherein the input is configured to receive signals in a cable television (CATV) bandwidth and signals in a multimedia over coax alliance (MoCA) bandwidth;

wherein the in-home network adapter comprises a diplexer comprising a high-pass filter and a low-pass filter;

wherein the in-home network adapter is configured to allow the signals in the MoCA bandwidth to pass from the input to the plurality of outputs and from the plurality of outputs to the input;

wherein the in-home network adapter is configured to attenuate or prevent the signals in the CATV bandwidth from passing from the input to the plurality of outputs, from the plurality of outputs to the input, or both;

wherein the in-home network adapter is configured to cause a return loss at the input to be greater than 20 dB in the CATV bandwidth and between about 5 dB and about 20 dB in the MoCA bandwidth without a bridge circuit;

wherein the first resistor has a lesser resistance than each of the second resistors to minimize a through-loss between the input and the plurality of outputs; and wherein each of the plurality of second resistors has a substantially equal resistance.

7. The system of claim 6, wherein the in-home network adapter is configured to cause a return loss at one of the plurality of outputs to be between about 0 dB and about 45 dB in the CATV bandwidth and between about 18 dB and about 42 dB in the MoCA bandwidth without the bridge circuit.

8. The system of claim 6, wherein the in-home network adapter is configured to cause an insertion loss between the input and the one of the plurality of outputs to be greater than about 40 dB in the CATV bandwidth and between about 15 dB and about 25 dB in the MoCA bandwidth without the bridge circuit.

9. The system of claim 6, wherein the high-pass filter and the low-pass filter have a common input and a common output such that the high-pass filter and the low pass filter are connected in parallel.

10. The system of claim 6, wherein the low-pass filter comprises two low-pass filter portions and an attenuator circuit that are connected in series with the attenuator circuit positioned between the two low-pass filter portions.

11. The system of claim 6, wherein the in-home network adapter does not comprise the bridge circuit.

12. The system of claim 6, further comprising:
a second input;
a second splitter configured to connect to the second input;
a second diplexer, wherein a first output of the second splitter is configured to connect to the second diplexer; and
a third diplexer, wherein the second diplexer is configured to connect to the third diplexer.

13. The system of claim 12, further comprising:
a first diode configured to connect to and be positioned between the second and third diplexers; and
a second diode configured to connect to and be positioned between the second and third diplexers.

14. The system of claim 13, wherein the first diode is configured to allow signals to pass from the second diplexer to the third diplexer, and wherein the first diode is configured to prevent signals from passing from the third diplexer to the second diplexer.

15. The system of claim 13, wherein the second diode is configured to allow signals to pass from the third diplexer to the second diplexer, and wherein the second diode is configured to prevent signals from passing from the second diplexer to the third diplexer.

16. The system of claim 12, further comprising:
a fourth diplexer, wherein the third diplexer is configured to connect to the fourth diplexer;
a fifth diplexer, wherein a second output of the second splitter is configured to connect to the fifth diplexer, wherein the fourth diplexer is configured to connect to the fifth diplexer;
a third splitter configured to connect to the fourth diplexer;
a second output configured to connect to the fifth diplexer; and
a plurality of third outputs configured to connect to the third splitter.

17. A system, comprising:
an input;
a plurality of outputs, wherein each output is configured to connect to a customer premise equipment (CPE) device;
an in-home network adapter configured to connect to and be positioned between the input and the plurality of outputs;
a splitter configured to connect to and be positioned between the in-home network adapter and the plurality of outputs;
wherein the input is configured to receive signals in a cable television (CATV) bandwidth and signals in a multimedia over coax alliance (MoCA) bandwidth;
wherein the in-home network adapter comprises a diplexer comprising a high-pass filter and a low-pass filter;
wherein the in-home network adapter is configured to allow the signals in the MoCA bandwidth to pass from the input to the plurality of outputs and from the plurality of outputs to the input;
wherein the in-home network adapter is configured to attenuate or prevent the signals in the CATV bandwidth from passing from the input to the plurality of outputs, from the plurality of outputs to the input, or both; and
wherein the in-home network adapter is configured to cause a return loss at the input to be in a first predetermined range in the CATV bandwidth and in a second predetermined range in the MoCA bandwidth without a bridge circuit.

18. The system of claim 17, wherein the high-pass filter and the low-pass filter have a common input and a common output such that the high-pass filter and the low pass filter are connected in parallel.

19. The system of claim 17, wherein the low-pass filter comprises two low-pass filter portions and an attenuator circuit that are connected in series with the attenuator circuit positioned between the two low-pass filter portions.

20. The system of claim 17, wherein the in-home network adapter does not comprise the bridge circuit.

21. The system of claim 17, further comprising:
a second input;
a second splitter configured to connect to the second input;
a second diplexer, wherein a first output of the second splitter is configured to connect to the second diplexer; and
a third diplexer, wherein the second diplexer is configured to connect to the third diplexer.

22. The system of claim 21, further comprising:
a first diode configured to connect to and be positioned between the second and third diplexers; and
a second diode configured to connect to and be positioned between the second and third diplexers.

23. The system of claim 22, wherein the first diode is configured to allow signals to pass from the second diplexer to the third diplexer, wherein the first diode is configured to prevent signals from passing from the third diplexer to the second diplexer, wherein the second diode is configured to allow signals to pass from the third diplexer to the second diplexer, and wherein the second diode is configured to prevent signals from passing from the second diplexer to the third diplexer.

24. The system of claim 21, further comprising:
a fourth diplexer, wherein the third diplexer is configured to connect to the fourth diplexer;
a fifth diplexer, wherein a second output of the second splitter is configured to connect to the fifth diplexer, wherein the fourth diplexer is configured to connect to the fifth diplexer;
a third splitter configured to connect to the fourth diplexer;
a second output configured to connect to the fifth diplexer; and
a plurality of third outputs configured to connect to the third splitter.

25. The system of claim 17, further comprising:
a first resistor configured to connect to and be positioned between the in-home network adapter and the splitter; and
a plurality of second resistors, wherein one of the plurality of second resistors is configured to connect to and be positioned between the splitter and each of the plurality of outputs.

26. The system of claim 25, wherein the first resistor has a lesser resistance than each of the second resistors to minimize a through-loss of the second device.

27. The system of claim 25, wherein each of the plurality of second resistors has a substantially equal resistance.

28. The system of claim 17, wherein the first predetermined range is greater than 20 dB.

29. The system of claim 17, wherein the second predetermined range is between about 5 dB and about 20 dB.

30. The system of claim 17, wherein the in-home network adapter is configured to cause a return loss at one of the plurality of outputs to be in a third predetermined range in the CATV bandwidth, and wherein the third predetermined range is between about 0 dB and about 45 dB.

31. The system of claim 17, wherein the in-home network adapter is configured to cause a return loss at one of the plurality of outputs to be in a third predetermined range in the MoCA bandwidth without the bridge circuit, and wherein the third predetermined range is between about 18 dB and about 42 dB.

32. The system of claim 17, wherein the in-home network adapter is configured to cause an insertion loss between the input and the one of the plurality of outputs to be in a third predetermined range in the CATV bandwidth, and wherein the third predetermined range is greater than about 40 dB.

33. The system of claim 17, wherein the in-home network adapter is configured to cause an insertion loss between the input and the one of the plurality of outputs to be in a third predetermined range in the MoCA bandwidth without the bridge circuit, and wherein the third predetermined range is between about 15 dB and about 25 dB.

34. A splitter comprising:
a network adapter configured to be connected to and be positioned between an input and a plurality of outputs;
wherein the network adapter is configured to attenuate or prevent signals in a cable television (CATV) bandwidth from passing from the input to the plurality of outputs, from the plurality of outputs to the input, or both; and
wherein the network adapter is configured to cause a return loss at the input to be in a first predetermined range in the CATV bandwidth and in a second predetermined range in a multimedia over coax alliance (MoCA) bandwidth without a bridge circuit.

35. The splitter of claim 34, wherein the network adapter is configured to allow the signals in the MoCA bandwidth to pass from the input to the plurality of outputs and from the plurality of outputs to the input.

36. The splitter of claim 34, wherein the network adapter comprises a diplexer comprising a high-pass filter and a low-pass filter.

37. The splitter of claim 36, wherein the high-pass filter and the low-pass filter have a common input and a common output such that the high-pass filter and the low pass filter are connected in parallel.

38. The splitter of claim 36, wherein the low-pass filter comprises two low-pass filter portions and an attenuator circuit that are connected in series with the attenuator circuit positioned between the two low-pass filter portions.

39. The splitter of claim 34, wherein the network adapter does not comprise the bridge circuit.

40. The splitter of claim 34, further comprising a splitter device configured to connect to and be positioned between the network adapter and the plurality of outputs.

41. The splitter of claim 40, further comprising a first resistor configured to connect to and be positioned between the network adapter and the splitter device; and
a plurality of second resistors, wherein one of the plurality of second resistors is configured to connect to and be positioned between the splitter device and each of the plurality of outputs.

42. The splitter of claim 34, wherein the first predetermined range is greater than 20 dB.

43. The splitter of claim 34, wherein the second predetermined range is between about 5 dB and about 20 dB.

44. The splitter of claim 34, wherein the network adapter is configured to cause a return loss at one of the plurality of outputs to be in a third predetermined range in the CATV bandwidth, and wherein the third predetermined range is between about 0 dB and about 45 dB.

45. The splitter of claim 34, wherein the network adapter is configured to cause a return loss at one of the plurality of outputs to be in a third predetermined range in the MoCA bandwidth without the bridge circuit, and wherein the third predetermined range is between about 18 dB and about 42 dB.

46. The splitter of claim 34, wherein the network adapter is configured to cause an insertion loss between the input and the one of the plurality of outputs to be in a third predetermined range in the CATV bandwidth, and wherein the third predetermined range is greater than about 40 dB.

47. The splitter of claim 34, wherein the network adapter is configured to cause an insertion loss between the input and the one of the plurality of outputs to be in a third predetermined range in the MoCA bandwidth without the bridge circuit, and wherein the third predetermined range is between about 15 dB and about 25 dB.

48. A system for attenuating and splitting electronic signals comprising:
the splitter of claim 34; and
an electronic component configured to output electronic signals in the CATV bandwidth and in the MoCA bandwidth;
wherein the electronic component is configured to output one of the electronic signals to the input of the splitter.

49. The system of claim 48, wherein the electronic component includes an amplifier having a plurality of amplifier outputs configured to output the electronic signals in the CATV bandwidth and in the MoCA bandwidth; and
wherein one of the amplifier outputs is configured to be connected to the input of the splitter.

50. A splitter comprising:
attenuating means configured to be connected to and be positioned between an input and a plurality of outputs of the splitter, the attenuating means for attenuating or preventing signals in a cable television (CATV) bandwidth from passing from the input to the plurality of outputs; and
return loss means for causing a return loss at the input to be in a first predetermined range in the CATV bandwidth and in a second predetermined range in a multimedia over coax alliance (MoCA) bandwidth without a bridge circuit.

51. The splitter of claim 50, wherein the attenuating means and the return loss means comprise a network adapter.

52. The splitter of claim 51, wherein the return loss means comprises a network adapter.

53. The splitter of claim 52, wherein the network adapter is configured to allow the signals in the MoCA bandwidth to pass from the input to the plurality of outputs and from the plurality of outputs to the input.

54. The splitter of claim 52, wherein the network adapter comprises a diplexer comprising a high-pass filter and a low-pass filter.

55. The splitter of claim 52, wherein the high-pass filter and the low-pass filter have a common input and a common output such that the high-pass filter and the low pass filter are connected in parallel.

56. The splitter of claim 55, wherein the low-pass filter comprises two low-pass filter portions and an attenuator circuit that are connected in series with the attenuator circuit positioned between the two low-pass filter portions.

57. The splitter of claim 52, wherein the network adapter does not comprise the bridge circuit.

58. The splitter of claim 52, further comprising a splitter device configured to connect to and be positioned between the network adapter and the plurality of outputs.

59. The splitter of claim 58, further comprising:
a first resistor configured to connect to and be positioned between the network adapter and the splitter device; and
a plurality of second resistors, wherein one of the plurality of second resistors is configured to connect to and be positioned between the splitter device and each of the plurality of outputs.

60. The splitter of claim 50, wherein the first predetermined range is greater than 20 dB.

61. The splitter of claim 50, wherein the second predetermined range is between about 5 dB and about 20 dB.

62. The splitter of claim 50, wherein the network adapter is configured to cause a return loss at one of the plurality of outputs to be in a third predetermined range in the CATV bandwidth, and wherein the third predetermined range is between about 0 dB and about 45 dB.

63. The splitter of claim 50, wherein the network adapter is configured to cause a return loss at one of the plurality of outputs to be in a third predetermined range in the MoCA bandwidth without the bridge circuit, and wherein the third predetermined range is between about 18 dB and about 42 dB.

64. The splitter of claim 50, wherein the network adapter is configured to cause an insertion loss between the input and the one of the plurality of outputs to be in a third predetermined range in the CATV bandwidth, and wherein the third predetermined range is greater than about 40 dB.

65. The splitter of claim 50, wherein the network adapter is configured to cause an insertion loss between the input and the one of the plurality of outputs to be in a third predetermined range in the MoCA bandwidth without the bridge circuit, and wherein the third predetermined range is between about 15 dB and about 25 dB.

66. A system for attenuating and splitting electronic signals comprising:
the splitter of claim 50;
an electronic component configured to output electronic signals in the CATV bandwidth and in the MoCA bandwidth; and
wherein the electronic component is configured to output one of the electronic signals to the input of the splitter.

67. The system of claim 66, wherein the electronic component includes an amplifier having a plurality of amplifier outputs configured to output the electronic signals in the CATV bandwidth and in the MoCA bandwidth; and
wherein one of the amplifier outputs is configured to be connected to the input of the splitter.

* * * * *